United States Patent
Swaminathan

(10) Patent No.: US 8,370,651 B2
(45) Date of Patent: Feb. 5, 2013

(54) METHOD AND SYSTEM FOR OPTIMIZED POWER MANAGEMENT AND EFFICIENCY IN WIRELESS UNIVERSAL SERIAL BUS NETWORK

(75) Inventor: Sundaresan Swaminathan, Mandaveli Chennai (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 490 days.

(21) Appl. No.: 12/585,275

(22) Filed: Sep. 10, 2009

(65) Prior Publication Data
US 2010/0070665 A1    Mar. 18, 2010

(30) Foreign Application Priority Data

Sep. 15, 2008  (IN) ........................ 2246/CHE/2008P
May 22, 2009  (IN) ........................... 2246/CHE/2008

(51) Int. Cl.
G06F 1/32    (2006.01)
(52) U.S. Cl. ........................ 713/300; 713/310; 713/320
(58) Field of Classification Search .................. 713/300, 713/310, 320
See application file for complete search history.

(56) References Cited

U.S. PATENT DOCUMENTS

| | | | |
|---|---|---|---|
| 2006/0166621 A1* | 7/2006 | Bae et al. | 455/41.2 |
| 2008/0320279 A1* | 12/2008 | Machin | 712/29 |
| 2010/0262734 A1* | 10/2010 | Sohn et al. | 710/107 |
| 2011/0173476 A1* | 7/2011 | Reed | 713/323 |

OTHER PUBLICATIONS

Wireless Universal Serial Bus Specificatin, HP, Intel, LSI, Microsoft, Samsung, ST-Ericsson, Oct. 9, 2010.*
"Wireless Serial Bus Specification 1.1 Revision .75", published Feb. 20, 2008 (Redline and Clean).

* cited by examiner

Primary Examiner — Kim Huynh
Assistant Examiner — Zahid Choudhury
(74) Attorney, Agent, or Firm — Harness, Dickey & Pierce, P.L.C.

(57) ABSTRACT

A method and system for optimizing certified Wireless Universal Serial Bus (WUSB) power management and efficiency are disclosed. For example, the method may introduce a master Micro Management Control (MMC) and a master MMC period and may require the host to schedule transactions to the awake devices in a master MMC period. Further, the work pending indication may have been provided in the master MMC that may start the master MMC period. Moreover, the method also may require the WUSB host to indicate a work pending indication to devices in the master MMC that may be in a sleep mode.

20 Claims, 5 Drawing Sheets

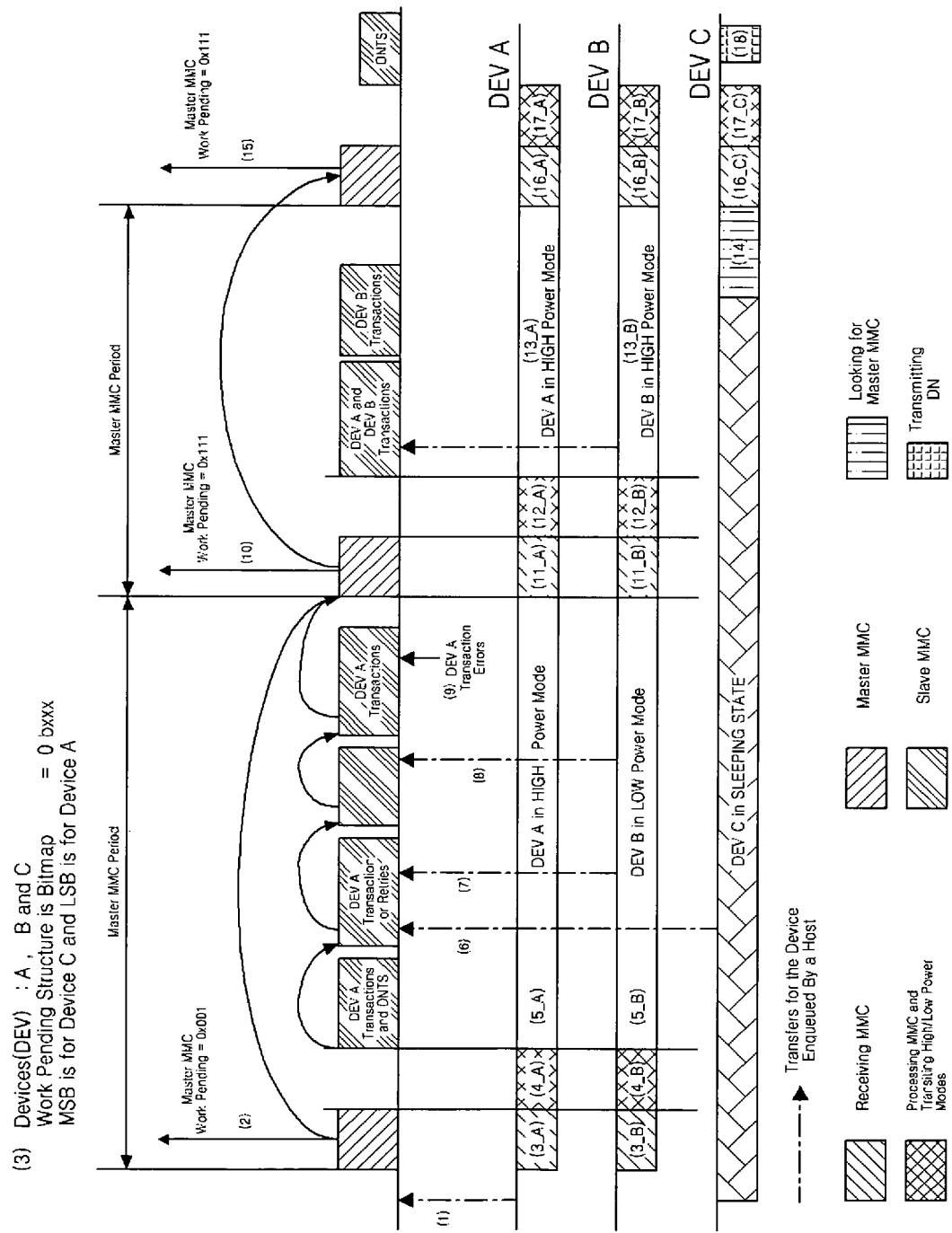

METHOD AND SYSTEM FOR OPTIMIZED POWER MANAGEMENT AND EFFICIENCY IN WIRELESS UNIVERSAL SERIAL BUS NETWORK

CROSS-REFERENCE TO RELATED APPLICATION

This non-provisional U.S. application claims priority to Indian Patent Application No. IN2246/CHE/2008 (provisional), filed on Sep. 15, 2008 and Indian Patent No. IN2246/CHE/2008, filed on May 22, 2009, the entire contents of which are herein incorporated by reference.

BACKGROUND

1. Field

Example embodiments relate to wireless serial bus networks, and more particularly to a method and system for managing power in wireless universal serial bus networks.

2. Description of Related Art

Due to increases in the use of Universal Serial Bus (USB) in communication devices, Wireless USB (WUSB) networks are becoming increasingly popular. WUSB networks are also referred to Certified WUSB (CWUSB). WUSB networks enable communication devices to communicate with each other in, for example, a range of a few meters. Examples of these utilized communication devices include: personal computers, laptops, personal digital assistants, mobile phones, and other similar devices.

CWUSB devices may be in three modes. For example, the CWUSB devices may be in 'switched off mode' (or disconnected mode), in 'sleep mode', or in 'awake mode' (also referred to as 'active mode'). In 'switched off mode', the WUSB device is switched off. In the 'disconnected mode', the WUSB device is not connected to the WUSB network. Further, in 'active mode', active CWUSB devices may track all Micro Management Controls (MMCs) scheduled by a CWUSB host. Tracking all MMCs helps the active CWUSB devices check if any transactions are scheduled to the active CWUSB devices. Furthermore, an MMC is a protocol used by which a CWUSB host manages CWUSB device clusters.

CWUSB devices that are in 'sleep mode' wake up at various intervals and send either a DN_Alive notification (to the WUSB host) to transit to an awake state unconditionally or a DN_Sleep notification (to the WUSB host) to check if any work is pending with the CWUSB host. The intervals may be irregular and may be set by a vendor.

A CWUSB device may use a Device Notification Time Slot (DNTS) to send asynchronous notifications to the CWUSB host. According to existing techniques, a DNTS scheduling in MMCs by the CWUSB host is arbitrary. For example, a CWUSB device uses DNTSs to transit from 'sleep mode' to 'awake mode' or to check if any work is pending with the CWUSB host.

Generation rate of MMCs causes a great amount power consumption in CWUSB devices. As such, a CWUSB device in 'awake mode' needs to keep all hardware and/or software peripherals in the highest power mode so that the CWUSB device may immediately process any transactions that come in any MMC. Also, sending a DN_Sleep notification, to check if any work is pending with the CWUSB host, results in higher protocol and system overhead. In addition, to check if any work is pending with the host, a CWUSB device needs to place both hardware and software in high power mode and perform a protocol operation (resulting in further overhead). Moreover, scheduling a DNTS in MMCs by the CWUSB host requires CWUSB devices to track each MMC to detect a DNTS and to then transmit. As detection of DNTS is non-deterministic, the DNTS tends to waste device power.

In light of the above discussion, there is a need for a method and system to efficiently manage power in wireless universal serial bus networks.

SUMMARY

According to example embodiments, a method for managing power in Wireless Universal Serial Bus (WUSB) network may be provided. The WUSB network may include a WUSB host and WUSB devices. The method further may include receiving by the WUSB devices, a master micro management control (MMC) from the WUSB host. The master MMC may be defined by the WUSB host and may include a work indication structure indicating presence of data for the WUSB devices in the WUSB network. The method also may include receiving and processing data by a first set of WUSB devices in a master MMC period, where bits corresponding to the first set of WUSB devices in the work indication structure may be set. Moreover, the master MMC period may be a period between two continuous master MMCs.

According to example embodiments, a method for managing power in a Wireless Universal Serial Bus (WUSB) network may be provided. The WUSB network may include a WUSB host and WUSB devices. The method may include receiving by the WUSB devices, a master Micro Management Control (MMC) from the WUSB host. Further, the master MMC may be defined by the WUSB host. The master MMC may include a work indication structure indicating if work is pending for the WUSB devices, where bits corresponding to each WUSB device in the WUSB network may be set in the work indication structure. The method also may include receiving data by a first set of WUSB devices in a master MMC period. The first set of WUSB devices may be in awake mode. Moreover, the master MMC period may be a period between two continuous master MMCs.

According to example embodiments, a method for managing power in a Wireless Universal Serial Bus (WUSB) network may be provided. The WUSB network may include a WUSB host and WUSB devices. The method may also include receiving by the WUSB devices, a master Micro Management Control (MMC) from the WUSB host. Further, the master MMC may be defined by the WUSB host. The master MMC may include a work indication structure for each WUSB device indicating if work is pending for corresponding WUSB device, where bits corresponding to the each WUSB device in the WUSB network may be set in the work indication structure. The method further includes, sending DN_Alive message by WUSB devices in sleep mode. The method also includes, receiving data by WUSB devices in awake mode in a master MMC period. The master MMC period may be a period between two continuous master MMCs.

According to example embodiments, a Wireless Universal Serial Bus (WUSB) device may be provided. The WUSB device may include a first receiver configured to receive a master Micro Management Control (MMC) from the WUSB host. The master MMC may be defined by the WUSB host. Also, the master MMC may include a work indication structure indicating presence of data for the WUSB devices in the WUSB network. The receiver may also be configured to receive the data in a master MMC period when bits corresponding to the WUSB device may be set in the work indication structure. Further, the master MMC period may be a period between two continuous master MMCs. The WUSB device may also include a processor configured to process the data in the master MMC period.

According to example embodiments, a Wireless Universal Serial Bus (WUSB) device may be provided. The WUSB device may include a receiver configured to receive a master Micro Management Control (MMC) from the WUSB host. The master MMC may be defined by the WUSB host and may include a work indication structure for each WUSB device indicating if work is pending for corresponding WUSB device, where bits corresponding to the each WUSB device in the WUSB network are set in the work indication structure. The receiver may also be configured to receive the data in awake mode in a master MMC period. Further, the master MMC period may be a period between two continuous master MMCs.

BRIEF DESCRIPTION OF THE DRAWINGS

The above and/or other features and advantages will become more apparent and more readily appreciated by describing in detail example embodiments taken in conjunction with reference to the attached drawings in which:

FIG. 5 is an example flow diagram illustrating a Master Micro Management Control (MMC) operation for managing power in Wireless Universal Serial Bus (WUSB) network according to example embodiments.

DETAILED DESCRIPTION OF EXAMPLE EMBODIMENTS

Figure 1:
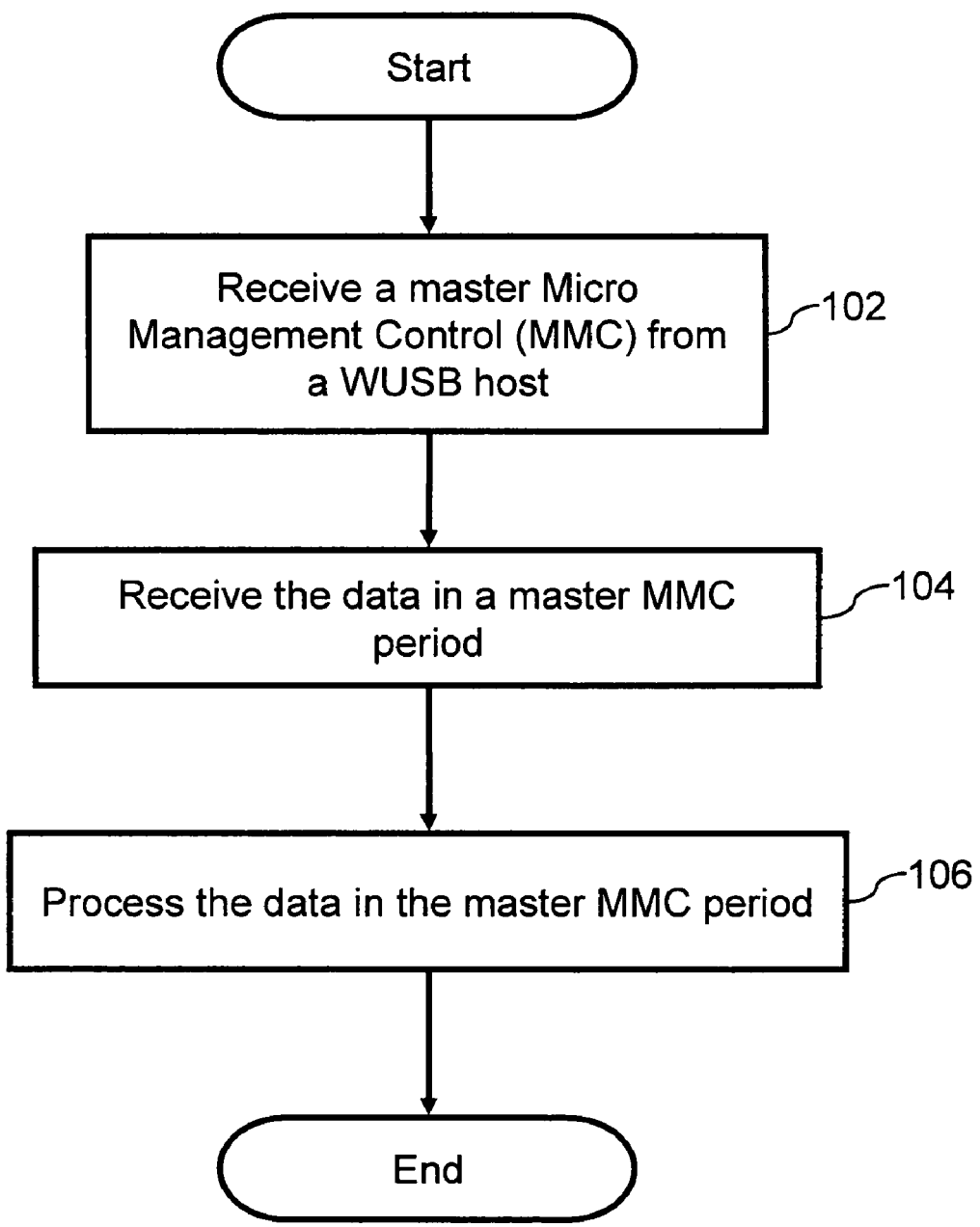
FIG. 1 is an example flow diagram depicting a method for managing power in a Wireless Universal Serial Bus (WUSB) network according to example embodiments.

Various example embodiments will now be described more fully with reference to the accompanying drawings in which example embodiments are shown. In the drawings, the thicknesses of regions may be exaggerated for clarity. Persons having ordinary skill in the art will appreciate that elements in the figures may be illustrated for simplicity and clarity and may have not been drawn to scale. For example, the dimensions of some of the elements in the figures may be exaggerated relative to other elements to help to improve understanding of example embodiments.

However, specific structural and functional details disclosed herein are merely representative for purposes of describing example embodiments. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Although example embodiments have been disclosed for illustrative purposes, those skilled in the art will appreciate that various modifications, additions and substitutions are possible, without departing from the scope and spirit of the invention as disclosed in the accompanying claims.

It may be observed that method steps and system components have been represented by conventional symbols in the figures, showing only specific details that are relevant for an understanding of example embodiments. Further, details that may be readily apparent to persons having ordinarily skilled in the art may not have been disclosed. In example embodiments, relational terms such as first and second, and the like, may be used to distinguish one entity from another entity, without necessarily implying any actual relationship or order between such entities. Furthermore, the set used in the document is a non-empty set.

Example embodiments provide a system and method for optimized power management and efficiency in Certified Wireless Universal Serial Bus (CWUSB) networks. In example embodiments, CWUSB may be referred to as Wireless Universal Serial bus (WUSB). For example, a CWUSB device may be referred to as a WUSB device, a CWUSB host may be referred to as a WUSB host, and a CWUSB network may be referred to as a WUSB network.

The method may define a master Micro Management Control (MMC) period. MMC is a protocol by which a CWUSB host may manage a CWUSB device cluster in the wireless Universal Serial Bus (USB) network. For example, a CWUSB host may not schedule new transfers to a CWUSB device received in a current master MMC period in the same master MMC period. The method may indicate work pending to all the connected devices in the master MMC. Also, Device Notification Time Slot (DNTS) slots may be scheduled in the first MMC after the master MMC in order to reduce arbitrary schedules. Further, the master MMC may indicate timing of the next master MMC. Accordingly, the master MMC mechanism may reduce the CWUSB device MMC polling rate.

An awake CWUSB device may place its processor or peripherals in a low power mode (for example, by means of clock gating, voltage scaling, etc.) until the awake CWUSB device finds a master MMC which includes a work pending indication to the awake CWUSB device. The CWUSB device may not turn receiver (RX) 'ON' for any of the MMCs in a master MMC if the CWUSB device has no work pending. A CWUSB device in sleep mode may need to only lock to a master MMC and find if there is work pending to the CWUSB device. If there is no work pending, the CWUSB device may continue to sleep. By making DNTS deterministic, CWUSB devices may not need to track every MMC for DNTS slots. Thus, the power efficiency of a CWUSB device may be improved to a greater extent.

A CWUSB host may define a master MMC whose period may not be constant. A CWUSB host may advertise a desired master MMC schedule in an explicit or implicit manner to all connected CWUSB devices. Moreover, a CWUSB host may dynamically change this desired schedule. A CWUSB host may alternatively indicate only the next master MMC or a set of consecutive master MMCs. There may be any number of MMCs between two continuous master MMCs. The MMCs between the master MMCs may be denoted as slave MMCs or regular MMCs. The time period between two continuous master MMCs may be denoted as master MMC period.

For example, it will be appreciated that the master MMC may be tracked by a CWUSB device in any of the following ways but are not limited to:

(1) A current MMC packet has two bytes reserved for future use.
   i. Every MMC uses these two bytes to indicate a next master MMC time offset or lower bound.
   ii. CWUSB devices implicitly understand the first MMC after the indicated time to be the master MMC.
   iii. A CWUSB device may confirm the master MMC if detecting the change in the two bytes value.

(2) To avoid consuming the reserved bytes, a new master MMC information element (IE) may be defined.
   i. The master MMC IE may contain the next master MMC time offset or a set of consecutive master MMCs.
   ii. The master MMC IE may contain an indication signaling the current MMC is master MMC.
   iii. The master MMC IE may be included in the master MMC.
   iv. The master MMC IE may be included in the slave MMCs also (which would make item ii. relevant in an example embodiment). By including the master MMC IEs in slave MMCs, a sleeping device or a device which has lost track may become synchronized to the master MMC Cycle in less time.

The master MMC period may also be configurable.

Further, the CWUSB host may form a work indication structure (for example, a bitmap or explicit values) for all new transfers to all connected devices (irrespective of whether a connected device is sleeping or awake).

The work indication structure formed in a current master MMC period may be transmitted in the upcoming master MMC. As such, the work indication structure may be a new IE or may be combined with master a MMC IE. Further, separate work indication structures may be maintained separately for sleeping and awake devices.

The CWUSB host may schedule transactions in the MMCs only to those devices which meet the following conditions: the CWUSB device is an awake state according to the CWUSB host; the CWUSB device has a work pending indication in the work indication structure included in the master MMC defining the current master MMC cycle, and the awake CWUSB device would have exited its low power mode to a high power mode with which it is capable to process CWUSB transactions.

The CWUSB host may not schedule transactions in the slave MMCs after a master MMC to the sleeping devices even though they might have a work pending indication in the work indication structure included in the master MMC. The host, thus, waits for DN_Alive from these sleeping devices before scheduling transactions. Further, the CWUSB host may not schedule any transactions to any device in the master MMC.

Also, each of the awake devices may know the master MMC and may poll only the next the master MMC instead of all slave MMCs if it has no work pending in a current MMC master period.

The host may also schedule DNTS slots in a first slave MMC after a master MMC enables the devices to know a prior to the DNTS schedule.

The host may also release the remainder of the Distributed Reservation Protocol (DRP) reservation block if no transactions are to be scheduled in the current master MMC period provided that the master MMC period spans more than a reservation block. DRP is a protocol by which utilizes Protocol Adaptation Layers (PALS) such as WUSB, Bluetooth (Bluetooth™), and WiMedia Link Protocol (WLP) reserve time during a superframe for communication.

A CWUSB host may take the value of CWUSB device's low power exit latency from the following: (1) The CWUSB device may advertise its low power exit latency/latencies during enumeration or at run time (by using DN's or control transfers) and/or (2) The CWUSB host may assume a default value if it has not obtained the knowledge of the device's low power exit latency/latencies from the device.

The master MMC mechanism may also be extensible to allow the CWUSB devices to have a MMC polling rate which is less than the master MMC polling/generation rate. Having such a MMC polling rate may be achievable by including more complexity in the CWUSB host controller.

According to example embodiments, FIG. 1 illustrates an example flow diagram depicting a method for managing power in a Wireless Universal Serial Bus (WUSB) network. The WUSB network may include a WUSB host and at least one WUSB device. Examples of the WUSB host and WUSB devices include, for example, personal computers, personal digital assistants and other similar devices. At step 102, a master Micro Management Control (MMC) is received by the WUSB devices in the WUSB network. Furthermore, the master MMC may be defined and broadcasted by the WUSB host in the WUSB network. The master MMC may include a work indication structure that indicates presence of data for the WUSB devices in the WUSB network. At step 104, the data for the WUSB devices is received by a first set of WUSB devices in a MMC period. Moreover, the bits corresponding to these first set of WUSB devices may be set in the master work indication structure. A period between two master MMCs may be defined as a master MMC period. At step 106, the first set of WUSB devices process the data received in the master MMC period.

Further, a second set of WUSB devices in the WUSB network may ignore the data, if the bits correspond to the second set of WUSB devices. In an example embodiment, the WUSB host may broadcast multiple regular MMCs in a master MMC period. The first set of WUSB devices may receive and process each regular MMC of the multiple regular MMCs in the master MMC period. Also, the master MMC may include an information element. This information element may be used by the WUSB devices to differentiate between master MMCs and regular MMCs. The MMC also may include a time offset that is equal to the master MMC period or remaining time to a master MMC in a current Master MMC cycle. In example embodiments, the master MMC period may be inconstant and may be configured by the WUSB host.

Figure 2:
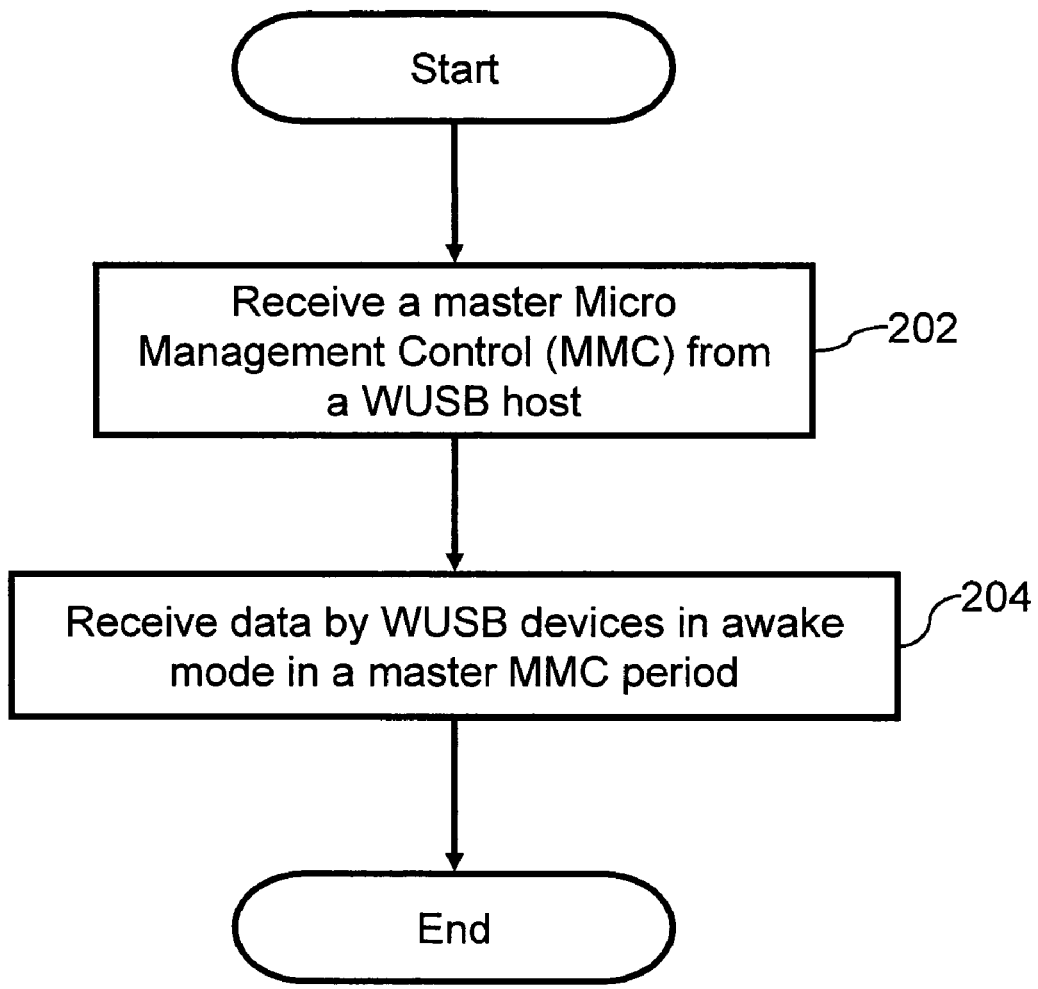
FIG. 2 is an example flow diagram depicting a method for managing power in a Wireless Universal Serial Bus (WUSB) network according to example embodiments.

According to example embodiments, FIG. 2 illustrates an example flow diagram depicting a method for managing power in a Wireless Universal Serial Bus (WUSB) network. At step 202, a master Micro Management Control (MMC) may be received by the WUSB devices in the WUSB network. For example, the master MMC may be provided and broadcasted by the WUSB host in the WUSB network. The master MMC may include a work indication structure that indicates presence of data for the WUSB devices in the WUSB network. Bits corresponding to each WUSB device in the WUSB network may be set in the work indication structure. At step 204, the (first set of) WUSB devices in awake mode receive data in the master MMC period. For example, the master MMC period may be a period between two continuous master MMCs. In an example embodiment, the WUSB devices in sleep mode send DN_Alive messages to the WUSB host. Subsequently, these WUSB devices may switch from sleep mode to awake mode and may receive data in the master MMC period.

Further, the WUSB host may broadcast multiple regular MMCs in the master MMC period. The (first set of) WUSB devices may receive and process each regular MMC of the multiple regular MMCs in the master MMC period. Further, the master MMC may include an information element. This information element may be used by the WUSB devices to differentiate between the master MMC and a regular MMC. The MMC may also include a time offset that is equal to the master MMC period or to the remaining time to the master MMC in a current master MMC cycle. In example embodiments, the master MMC period may be inconstant and may be configured by the WUSB host.

Figure 3:
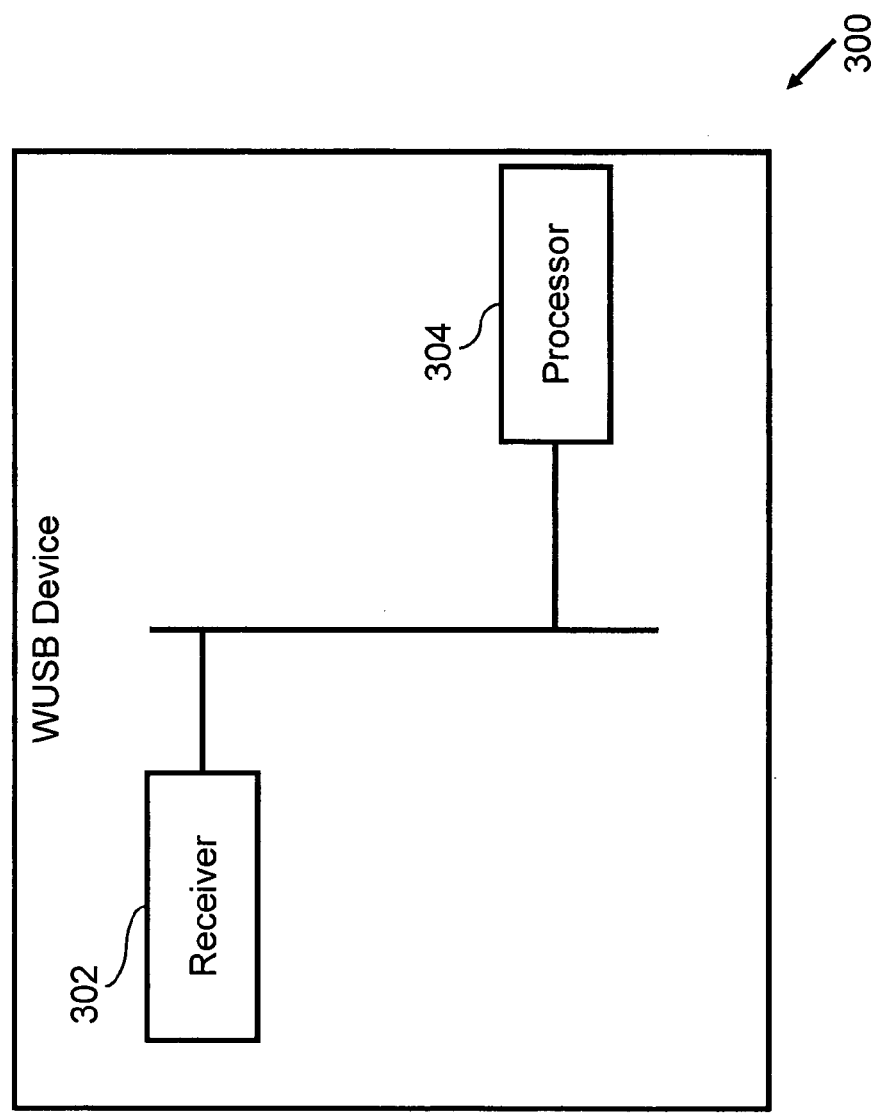
FIG. 3 is an example block diagram of a Wireless Universal Serial Bus (WUSB) device according to example embodiments.

According to example embodiments, FIG. 3 is an example block diagram of a Wireless Universal Serial Bus (WUSB) device. The WUSB device 300 may include a (first) receiver 302. The receiver 302 may be configured to receive a master Micro Management Control (MMC) from the WUSB host. For example, the master MMC may be provided by the WUSB host and may include a work indication structure that indicates presence of data for the WUSB devices in the WUSB network. The receiver 302 may also be configured to the data in a master MMC period when bits corresponding to the WUSB device are set in the work indication structure. Moreover, the master MMC period may be a period between two continuous master MMCs. The WUSB device may also include a processor 304 configured to process the data in the master MMC period.

Figure 4:
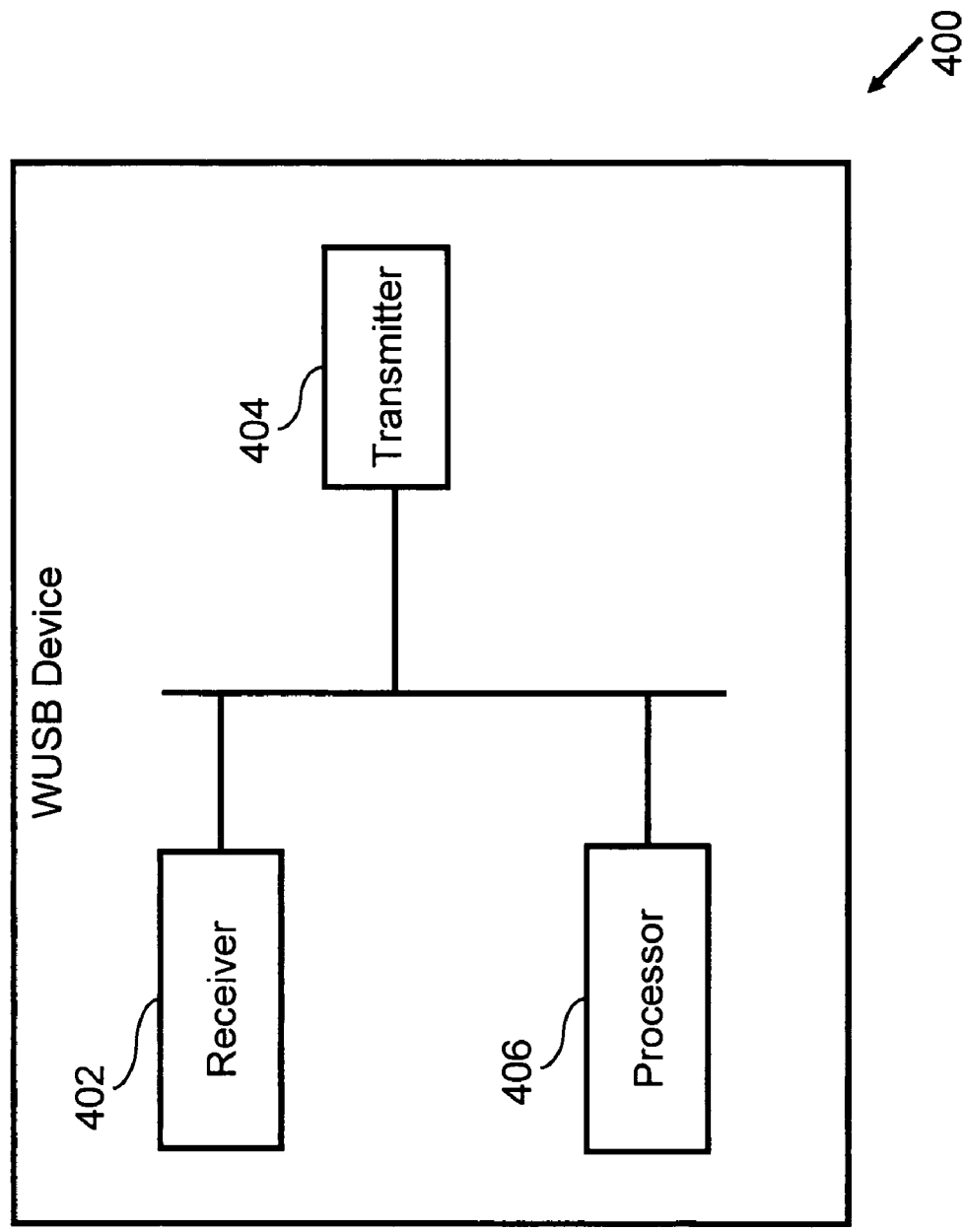
FIG. 4 is an example block diagram of a Wireless Universal Serial Bus (WUSB) device according to example embodiments.

According to example embodiments, FIG. 4 is an example block diagram of a Wireless Universal Serial Bus (WUSB) device. The WUSB device 400 may include a receiver 402 that is configured to receive a master Micro Management Control (MMC) from the WUSB host. For example, the master MMC may be provided by the WUSB host and may include a work indication structure for each WUSB device, where the work indication structure may indicate whether work is pending for a corresponding WUSB device. Further, bits corresponding to each WUSB device in the WUSB network may be set in the work indication structure. The receiver 402 may also be configured to receive the data in awake mode in a master MMC period. Moreover, the master MMC period may be a period between two continuous master MMCs. Further, the WUSB device may also include a transmitter 404 configured to send a DN_Alive message in sleep mode to the WUSB host. Also, once the DN_Alive message is sent by the WUSB device 400, the WUSB device may switch to awake mode. In an example embodiment, the receiver 402 and the transmitter 404 may be integrated as a transceiver. Further, the WUSB device may also include a processor 406 configured to process the data in the master MMC period.

According to example embodiments, FIG. 5 is an example flow diagram illustrating a Master Micro Management Control (MMC) operation for managing power in Wireless Universal Serial Bus (WUSB) network. For example, the flow diagram illustrates the following steps:

(1) Transfer enqueued MMCs for CWUSB device A by the CWUSB host.
(2) A CWUSB host transmits a master MMC with a next master MMC time offset and a current master MMC period work pending structure for all connected CWUSB devices.
(3) All awake CWUSB devices (for example, CWUSB device A and CWUSB device B) receive a master MMC. CWUSB device C is in a sleeping state and hence does not receive or process a master MMC. Further, the CWUSB host is aware that the CWUSB device C is in a sleeping state.
(4) All awake CWUSB devices (for example, CWUSB device A and CWUSB device B) process the master MMCs and determine the work pending.
(5) CWUSB device A switches to a high power mode and starts receiving and processing transactions. Also, the CWUSB host schedules transactions to CWUSB device A as a work pending indication is set for CWUSB device A. However, the CWUSB host does not schedule transactions for CWUSB device B as CWUSB device B does not have an indication of work pending. Accordingly, CWUSB device B goes into low power mode.
(6) Transfer enqueued MMCs for CWUSB device C by the CWUSB host. However, the CWUSB host does not schedule a transaction as it is aware that CWUSB device C is in sleep mode.
(7) Transfer enqueued MMCs for CWUSB device B by the CWUSB host. However, the CWUSB host does not schedule a transaction as it is aware that a work pending indication has not been set for the CWUSB device B in the most recent master MMC.
(8) Transfer enqueued MMCs for CWUSB device A by the CWUSB host. The CWUSB host continues with transactions for CWUSB device A as normal.
(9) As an example, if the CWUSB device A transaction has some errors, the CWUSB host considers the traffic to CWUSB device A is still pending.
(10) The CWUSB host transmits a master MMC with the next master MMC time offset and a work pending structure to CWUSB devices A, B and C, because CWUSB devices A, B, and C have transfers queued up.
(11) Same as step (3).
(12) Same as step (4).
(13) CWUSB device A continues to be in high power mode as it has work pending. CWUSB device B switches from low power mode to high power mode as it has a work pending indication. CWUSB device C continues to be in a sleeping state or sleep mode. Accordingly, the CWUSB host schedules transactions to only CWUSB device A and CWUSB device B.
(14) CWUSB device C decides to wake up and, thus, starts looking for a master MMC.
(15) The CWUSB host transmits a master MMC similar to step (10).
(16) CWUSB devices A, B, and C all receive a master MMC.
(17) CWUSB devices A, B, and C process a master MMC.
(18) Next, CWUSB device C sees that a work indication is set and, thus, transmits a DN (DN_Alive) to the CWUSB host to resume its operations and switches to a high power mode.

Example embodiments described above provide various advantages. For example, an awake CWUSB device may place a processor and/or peripherals in a low power mode (for example, by means of clock gating, voltage scaling or other similar means) until the awoken CWUSB device finds a master MMC which has a work pending indication for the awoken CWUSB device. Further, if it has no work pending, the CWUSB device may not need to turn a receiver 'ON' for any of the MMCs in a master MMC. Furthermore, a CWUSB device in sleep mode needs to only lock to a master MMC and find if there is work pending to the CWUSB device. If there is no work pending, the device may continue to be in a sleeping state or sleep mode. By making DNTS deterministic, CWUSB devices may not need to track every MMC for DNTS slots. Accordingly, power efficiency of a CWUSB device may be improved to a greater extent.

In an example embodiment, the techniques may be performed by the processor by executing one or more sequences of one or more instructions included in the main memory. These instructions may be read into the main memory from another machine-readable medium, for example, a storage device. Execution of the sequences of instructions included in the main memory cause the processor to perform the method described herein. In example embodiments, hard-wired circuitry may be used in place of or in combination with software instructions to implement example embodiments.

The term "machine-readable medium" as used herein refers to any medium that participates in providing data that causes a machine to operate in a specific fashion. In one example embodiment, which is implemented using the computer system, various machine-readable mediums are involved, in providing instructions to the processor for execution. Such a medium may take many forms, including but not limited to storage media and transmission media. Storage media may include both non-volatile media and volatile media. Non-volatile media may include, for example, optical or magnetic disks, such as a storage device or other similar devices. Volatile media may include dynamic memory, such as the main memory. Transmission media may include coaxial cables, copper wire and fiber optics, including the wires that include the bus. Further, transmission media may also take the form of acoustic or light waves, such as those generated during radio-wave and infra-red data communications. All such media may be tangible to enable the instructions carried by the media detected by a physical mechanism that reads the instructions into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer may read, for example online software, download links, installation links, and online links.

In the preceding specification, example embodiments have been described with reference to specific embodiments. However, it will be apparent to a person ordinary skilled in the art that various modifications and changes can be made, without departing from the scope of example embodiments. Accordingly, the specification and figures are to be regarded as illustrative examples of example embodiments. All such possible modifications are intended to be included within the scope of example embodiments.

What is claimed is:

1. A method for managing power in a Wireless Universal Serial Bus (WUSB) network, the WUSB network including a WUSB host and WUSB devices, the method comprising:
    receiving by the WUSB devices, at least one master Micro Management Control (MMC) from the WUSB host, the WUSB host defining the at least one master MMC, the at least one master MMC including a work indication structure indicating presence of data for the WUSB devices in the WUSB network and including timing for a next master MMC; and
    receiving and processing at least one regular MMC including first data by a first set of the WUSB devices in a master MMC period, where bits corresponding to the first set of the WUSB devices in the work indication structure are set, and where the master MMC period is a period between one master MMC and a next master MMC.

2. The method of claim 1, further comprising:
    ignoring second data by a second set of the WUSB devices in the WUSB network, where bits corresponding to the second set of the WUSB devices are not set in the work indication structure.

3. The method of claim 1, further comprising:
    broadcasting at least one of a plurality of regular MMCs in the master MMC period by the WUSB host.

4. The method of claim 1, wherein the at least one master MMC further includes an information element, the information element configured to differentiate between a regular MMC and the at least one master MMC.

5. The method of claim 1, wherein the master MMC further includes a master MMC time offset, the master MMC time offset configured to be equal to at least one of the master MMC period and a remaining time to a next master MMC in a current master MMC cycle.

6. The method of claim 1, wherein the master MMC period is inconstant and configured by the WUSB host.

7. A method for managing power in a Wireless Universal Serial Bus (WUSB) network, the WUSB network including a WUSB host and WUSB devices, the method comprising:
    receiving by the WUSB devices, at least one master Micro Management Control (MMC) from the WUSB host, the WUSB host defining the at least one master MMC, the at least one master MMC including a work indication structure indicating if work is pending for the WUSB devices, where bits corresponding to each WUSB device in the WUSB network are set in the work indication structure; and
    receiving at least one slave MMC including first data by a first set of the WUSB devices in a master MMC period, where the first set of the WUSB devices are in an awake mode, and where the master MMC period is a period between one master MMC and a next master MMC.

8. The method of claim 7, further comprising:
    ignoring data by a second set of the WUSB devices, where the second set of the WUSB devices are in a sleep mode.

9. The method of claim 7, wherein the at least one master MMC further includes an information element, the information element configured to differentiate between a regular MMC and the master MMC.

10. The method of claim 7, wherein the master MMC further includes a master MMC time offset, the master MMC time offset configured to be equal to at least one of the master MMC period and a remaining time to a next master MMC in a current master MMC cycle.

11. The method of claim 7, wherein the master MMC period is inconstant and configured by the WUSB host.

12. A method for managing power in a Wireless Universal Serial Bus (WUSB) network, the WUSB network including a WUSB host and WUSB devices, the method comprising:
 receiving by the WUSB devices, at least one master Micro Management Control (MMC) from the WUSB host, the WUSB host defining the at least one master MMC, the at least one master MMC including a work indication structure, for each WUSB device, indicating if work is pending for the WUSB devices, where bits corresponding to the each WUSB device in the WUSB network are set in the work indication structure;
 sending a DN_Alive message by the WUSB devices in a sleep mode; and
 receiving by the WUSB devices in an awake mode, at least one regular MMC including data during a master MMC period, where the master MMC period is a period between one master MMC and a next master MMC.

13. The method of claim 12, wherein the master MMC further includes an information element, the information element configured to differentiate between a regular MMC and the at least one master MMC.

14. The method of claim 12, wherein the master MMC further includes a master MMC time offset, the master MMC time offset configured to be equal to at least one of the master MMC period and a remaining time to a next master MMC in a current master MMC cycle.

15. The method of claim 12, wherein the master MMC period is inconstant and configured by the WUSB host.

16. A Wireless Universal Serial Bus (WUSB) device comprising:
 a receiver configured to receive,
 at least one master Micro Management Control (MMC) from a WUSB host, the WUSB host defining the at least one master MMC, the at least one master MMC including a work indication structure indicating presence of data for the WUSB device in the WUSB network; and
 at least one regular MMC including the data in a master MMC period when bit corresponding to a WUSB device is set the work indication structure, where the master MMC period is a period between one master MMC and a next master MMC; and
 a processor configured to process the data in the master MMC period.

17. A Wireless Universal Serial Bus (WUSB) device comprising:
 a receiver configured to receive, including,
 at least one master Micro Management Control (MMC) from a WUSB host, the WUSB host defining the at least one master MMC, the at least one master MMC including a work indication structure, for each WUSB device, indicating if work is pending for a plurality WUSB devices, where bits corresponding to the each WUSB device of the plurality of WUSB devices in the WUSB network are set in the work indication structure;
 at least one regular MMC including data in an awake mode in a master MMC period, where the master MMC period is a period between one master MMC and a next master MMC.

18. The WUSB device of claim 17, further comprising:
 a transmitter configured to send a DN_Alive message in a sleep mode.

19. The WUSB device of claim 18, wherein at least one of the receiver and the transmitter are integrated as a transceiver.

20. The WUSB device of claim 17, further comprising:
 a processor configured to process the data in the master MMC period.

* * * * *